Figure 1:
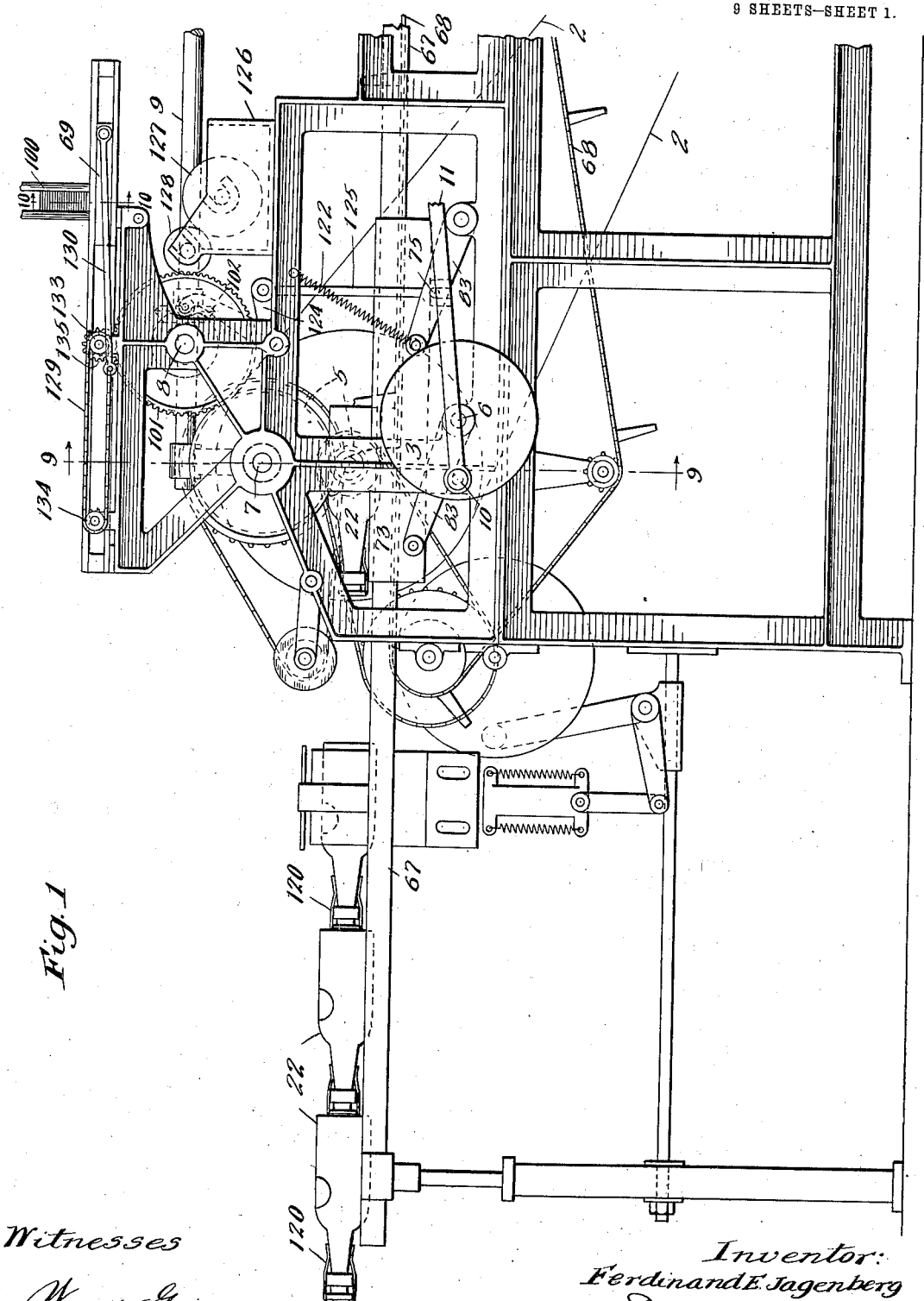

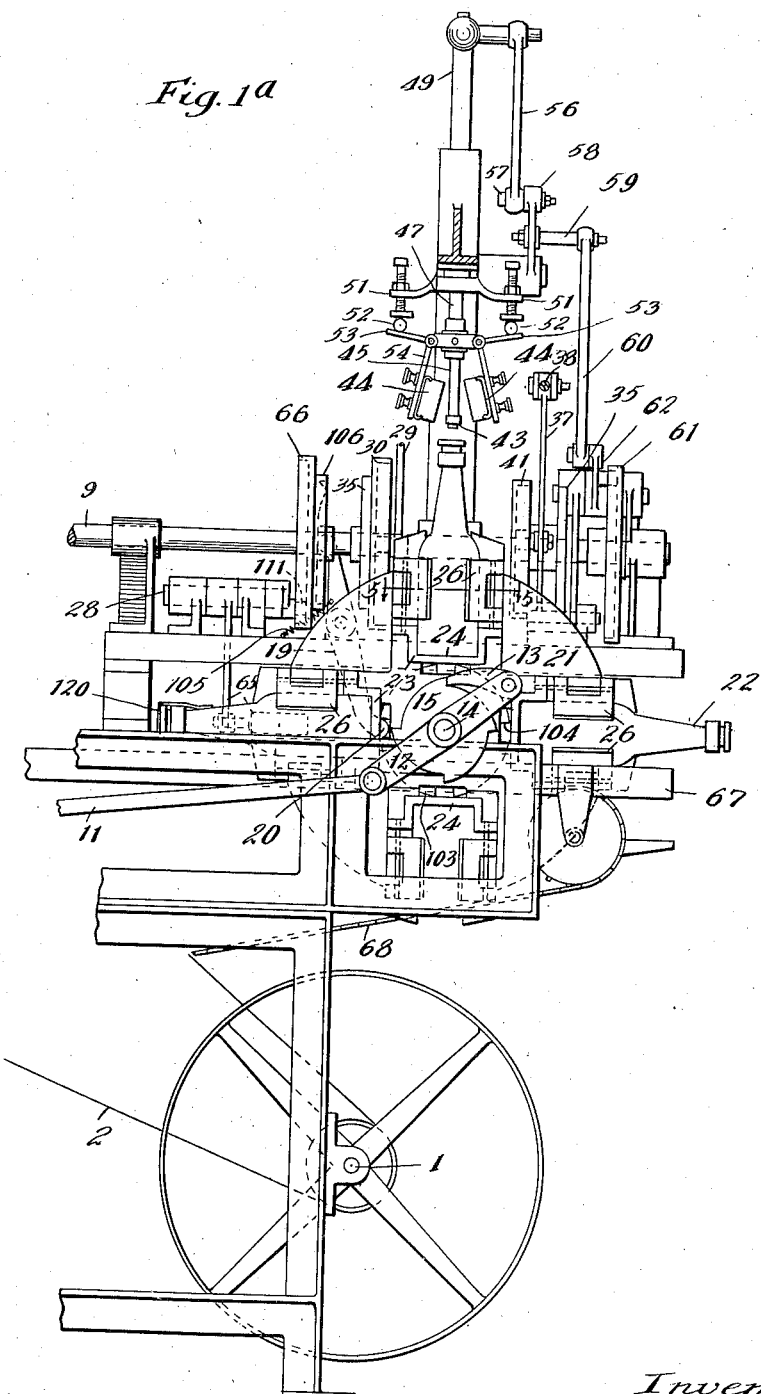

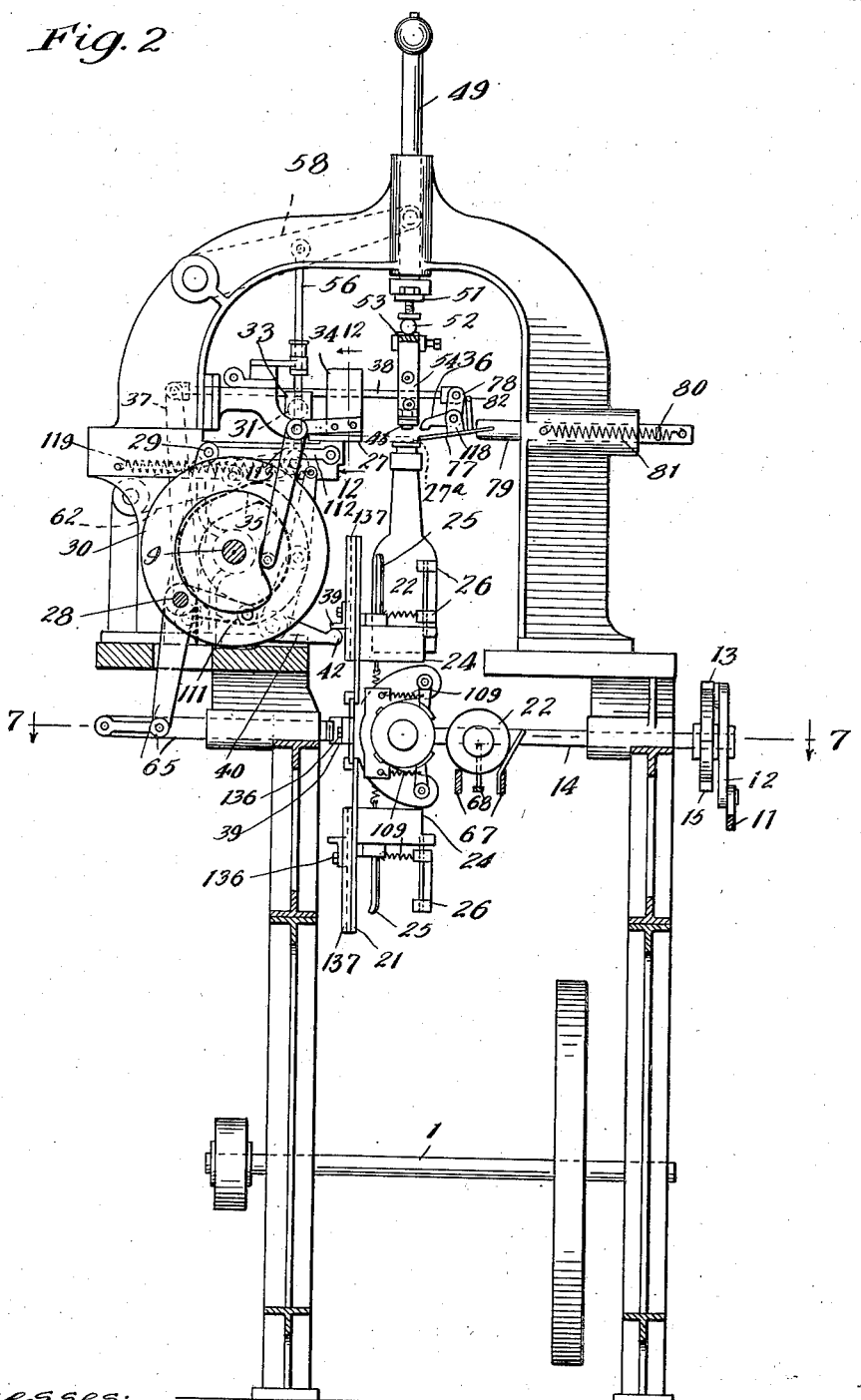

F. E. JAGENBERG.
MACHINE FOR PASTING LABELS OR BANDS ON FILLED BOTTLES.
APPLICATION FILED JUNE 25, 1909.

987,235.

Patented Mar. 21, 1911.

9 SHEETS—SHEET 4.

Witnesses:
Wm. Geiger
H. W. Munday

Inventor:
Ferdinand E. Jagenberg
By Munday, Evarts, Adcock & Clarke
Attorneys

F. E. JAGENBERG.
MACHINE FOR PASTING LABELS OR BANDS ON FILLED BOTTLES.
APPLICATION FILED JUNE 25, 1909.
987,235.
Patented Mar. 21, 1911.
9 SHEETS—SHEET 5.
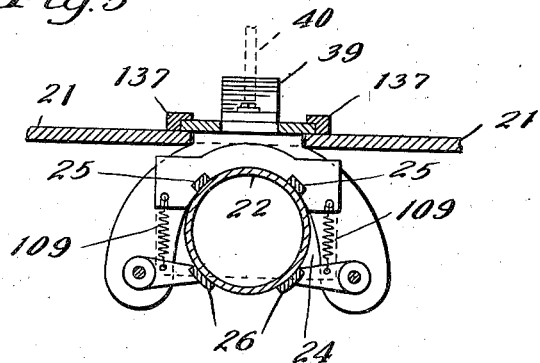
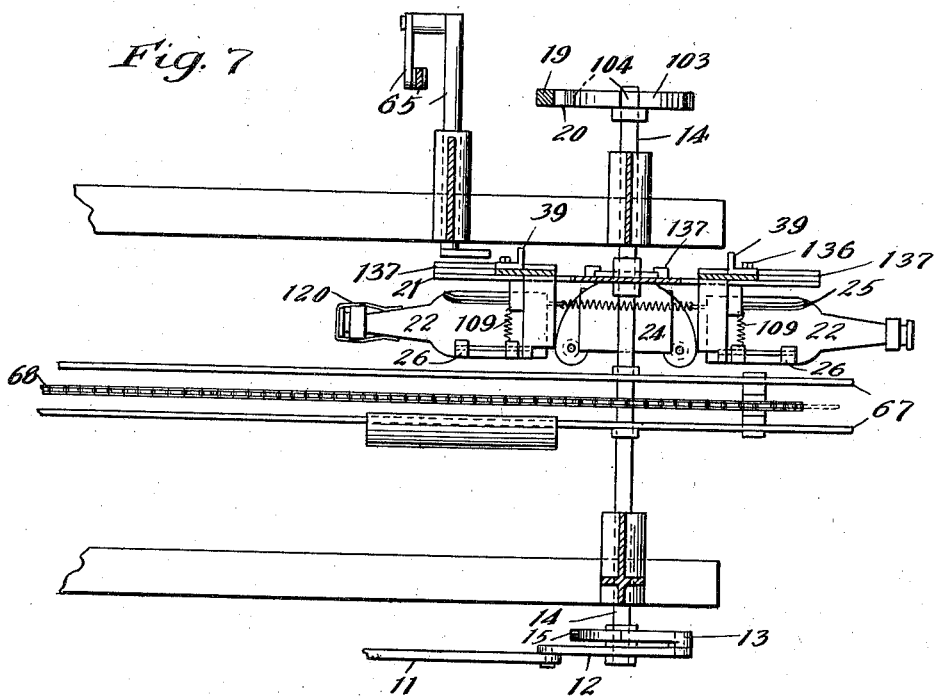
Witnesses:
Wm. Geiger
H. W. Munday
Inventor:
Ferdinand E. Jagenberg
By Munday, Evarts, Adcock & Clarke.
Attorneys

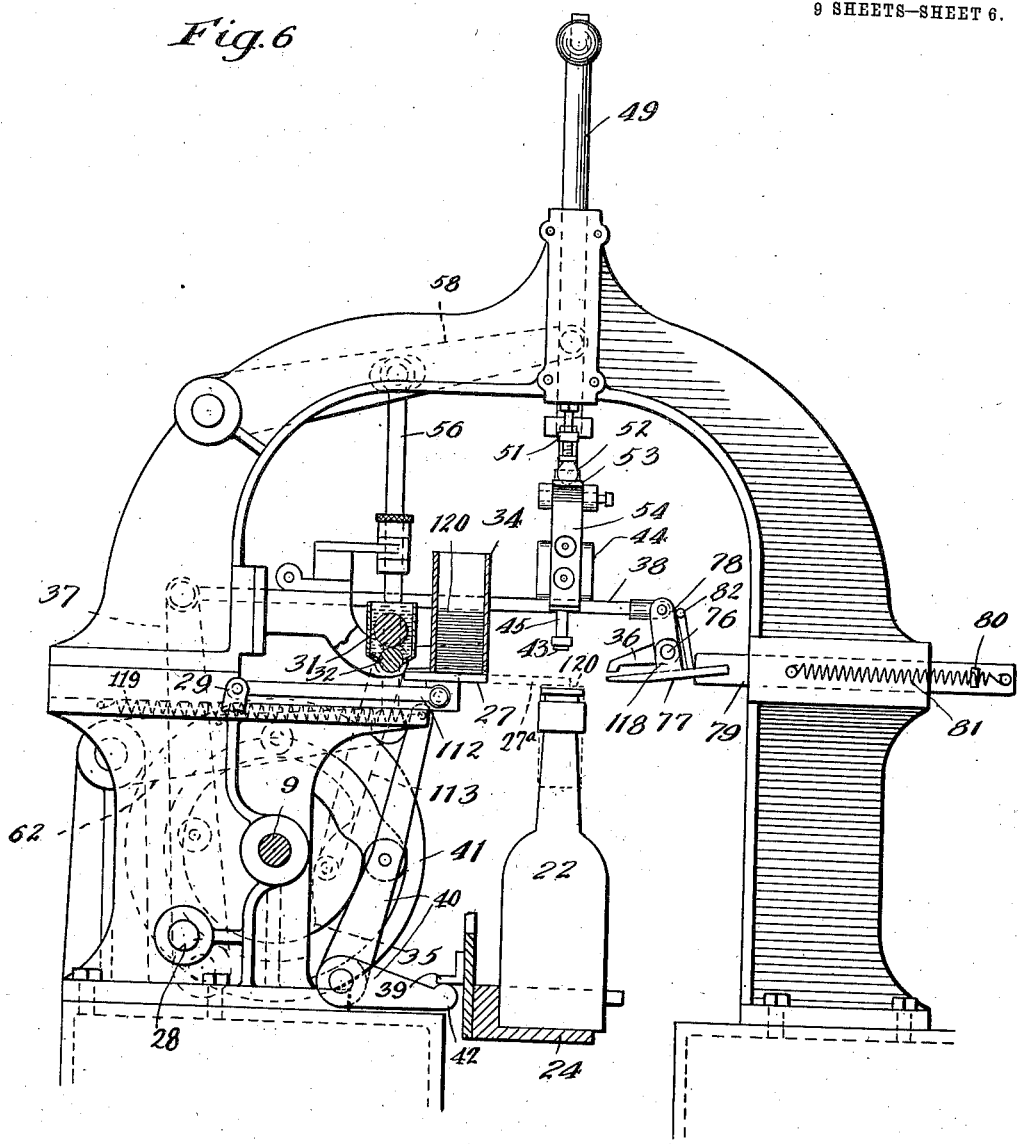

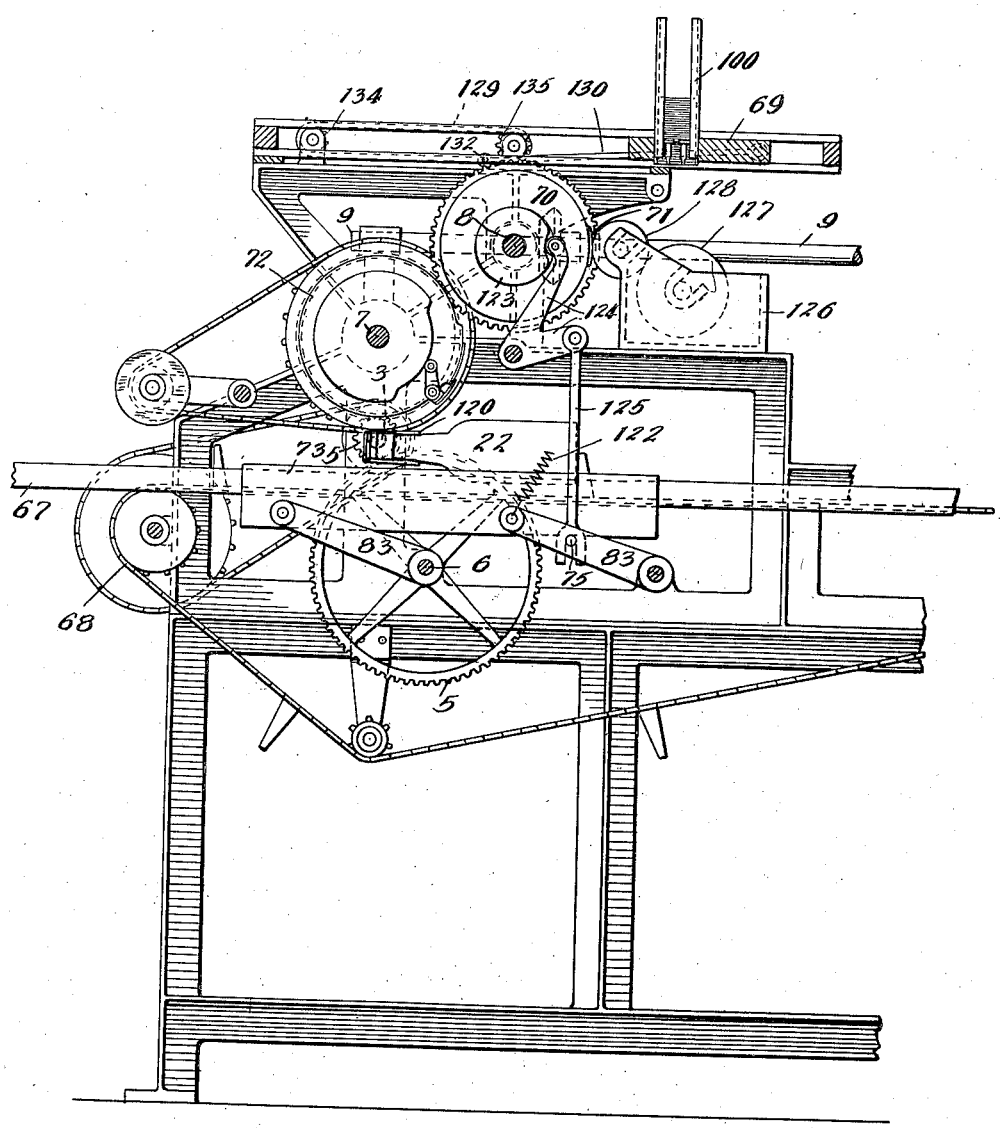

F. E. JAGENBERG.
MACHINE FOR PASTING LABELS OR BANDS ON FILLED BOTTLES.
APPLICATION FILED JUNE 25, 1909.

987,235.

Patented Mar. 21, 1911.

9 SHEETS—SHEET 8.

Witnesses:
Wm. Geiger

Inventor:
Ferdinand E. Jagenberg
By Munday, Evarts, Adcock & Clarke,
Attorneys

F. E. JAGENBERG.
MACHINE FOR PASTING LABELS OR BANDS ON FILLED BOTTLES.
APPLICATION FILED JUNE 25, 1909.

987,235.

Patented Mar. 21, 1911.

9 SHEETS—SHEET 9.

Witnesses:
Wm. Geiger
H. M. Munday

Inventor:
Ferdinand E. Jagenberg
By Munday, Evarts, Adcock & Clarke.
Attorneys

UNITED STATES PATENT OFFICE.

FERDINAND EMIL JAGENBERG, OF DUSSELDORF, GERMANY.

MACHINE FOR PASTING LABELS OR BANDS ON FILLED BOTTLES.

987,235.   Specification of Letters Patent.   Patented Mar. 21, 1911.

Application filed June 25, 1909. Serial No. 504,400.

*To all whom it may concern:*

Be it known that I, FERDINAND EMIL JAGENBERG, a citizen of Germany, residing in Dusseldorf, Germany, have invented a new and useful Improvement in Machines for Pasting Labels or Bands on Filled Bottles, of which the following is a specification.

My invention relates to bottle labeling machines.

The object of my invention is to provide a labeling machine of a simple construction which will operate to automatically paste top-labels or bands over the stoppers of filled bottles rapidly and cheaply.

A further object is to provide a combined machine which will operate not only to paste top-labels over the stoppers of the bottles and against the sides of the bottle necks, but also body labels on the sides or bodies of bottles.

In my invention each bottle in turn is automatically pushed upward under a presser-foot or pasting device for the middle portion of the label and under a top-label which is fed into place over the bottle neck and under such presser-foot and supported or suspended in such position by grippers at one end of the label and by the label feed device or plate at its other end, after which the presser-foot presses the middle portion of the label against the upper face of the bottle stopper, and a pair of swinging pressure pads are brought down over the top of the bottle and caused to press the end portions of the label against the sides of the bottle neck, thereby pasting on the neck label. To automatically present the bottles successively in turn to the top label pasting devices, a rotary bottle carrier is employed, furnished with a plurality, preferably four, radially movable bottle holders. Each bottle holder preferably has a plate upon which the bottom of the bottle rests, and a guide member to engage one side of the body of the bottle, and a pair of movable clamps to engage the opposite side of the bottle and hold it securely in position. After the top-labels have been pasted across the top of the bottle stopper and against the sides of the bottle neck, the top labeled bottles are discharged laterally in a horizontal position one by one from the bottle holders onto a horizontal track, which is to convey them to other arrangements to apply labels to the sides of the bottles. The top labels are fed one by one from a magazine by means of a horizontally reciprocating feed plate to the upper surface of which paste is applied by a pasting roller or other device, the paste causing the bottom label in the magazine to adhere to the feed plate. The label feeder thus also serves to apply the paste to the under face of the label. The label magazine is moved up and down to bring the lowermost label therein in contact with the label feed plate when said feed plate is moved under the magazine. When the horizontally reciprocating label feed plate carries the label into position over the bottle neck, and under the presser-foot, the front end of the label is grasped and held by grippers so that when the feed plate withdraws from over the bottle neck, the label is held or suspended in position at one end by the grippers and at the other end by the feed plate.

My invention consists in the novel construction of parts and devices and in the novel combinations of parts and devices herein shown and described and more particularly specified in the claims.

Figure 3:
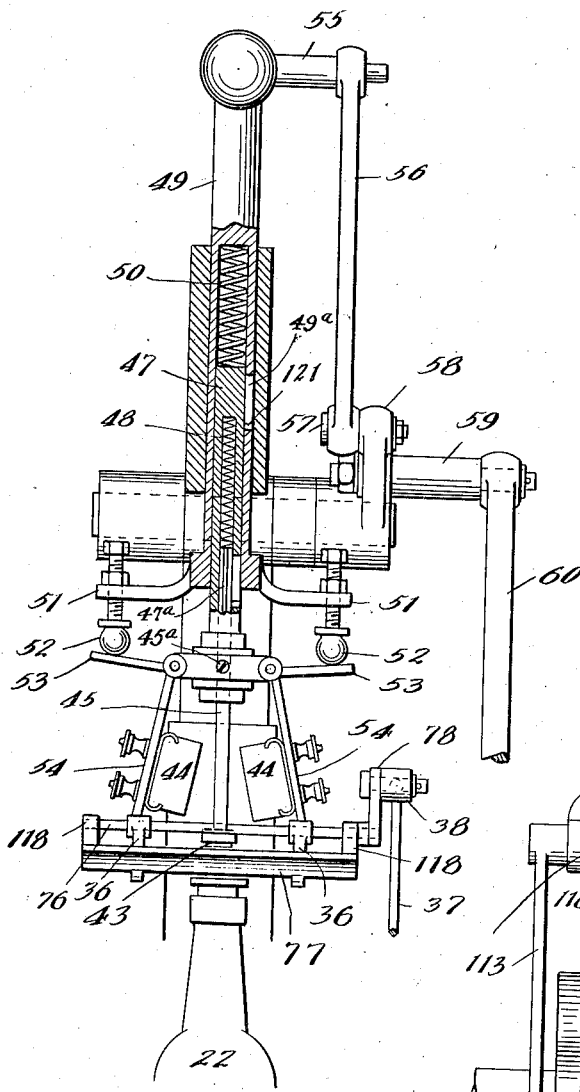
Figure 4:
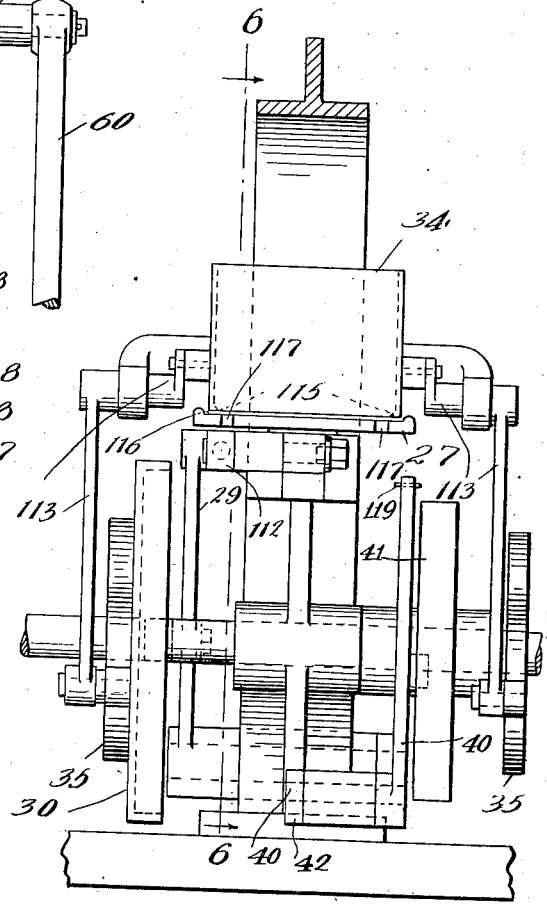
Figure 9:
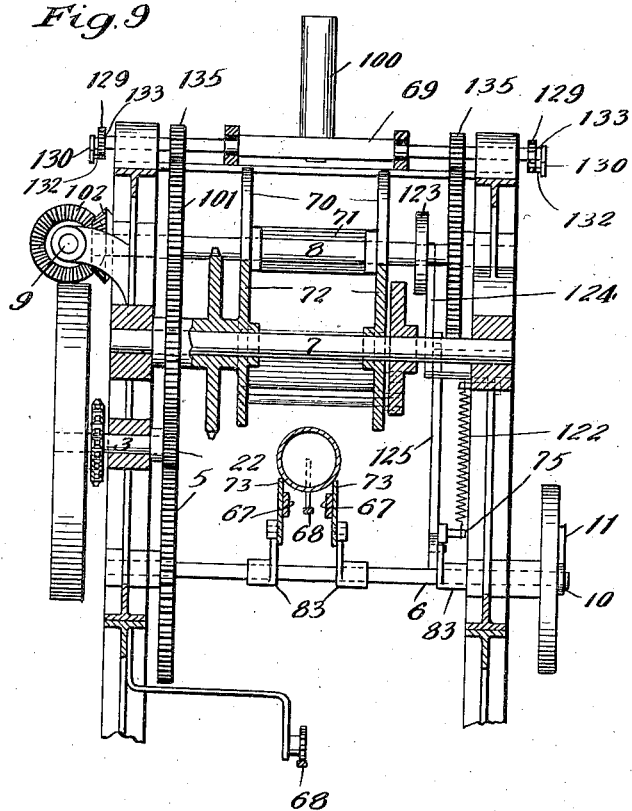
Figure 10:
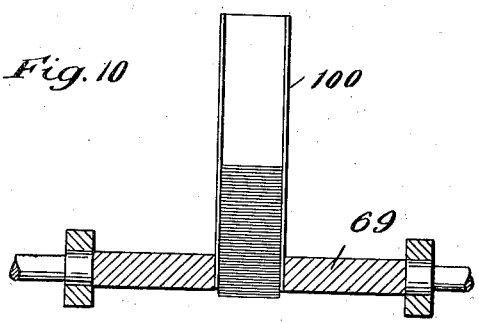
Figure 11:
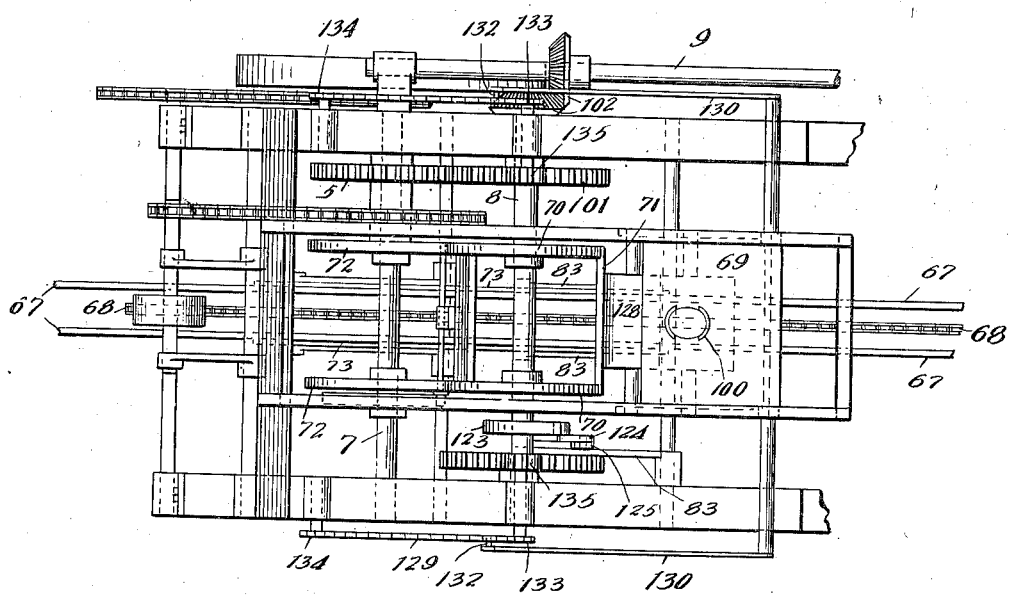
Figure 12:
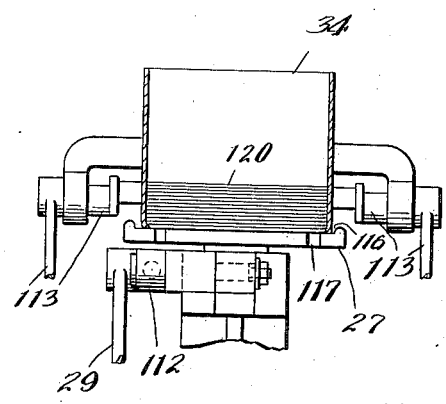
Figure 14:
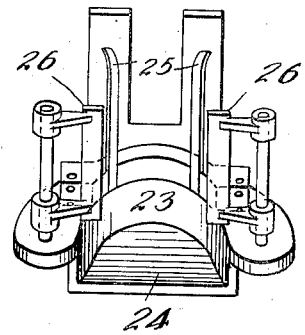
Figure 13:
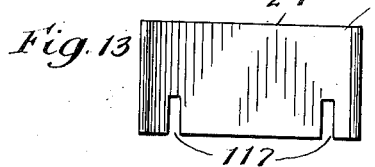

In the accompanying drawing forming a part of this specification, Figures 1 and 1ª taken together are a side elevation of a bottle labeling machine embodying my invention in combination with bottle body labeling arrangements, certain parts being indicated only in outline. Fig. 2 is a front view. Fig. 3 is a detail elevation of the top label pasting devices, partly in vertical section, and showing the parts in a different position from that indicated in Fig. 1ª. Fig. 4 is a detail elevation of the label feed mechanism, partly in vertical section. Fig. 5 is a detail section on line 5—5 of Fig. 1ª through a portion of the bottle carrier and one of the bottle holders thereon. Fig. 6 is a detail vertical section on line 6—6 of Fig. 4. Fig. 7 is a detail horizontal section on line 7—7 of Fig 2. Fig. 8 is a detail central, vertical longitudinal section of the body label applying mechanism. Fig. 9 is a detail vertical section on line 9—9 of Fig. 1. Fig. 10 is a detail vertical section on line 10—10 of Fig. 1, and Fig. 11 is a plan view. Fig. 12 is a detail vertical section on line 12—12 of Fig. 2. Fig. 13 is a detail plan view of the neck label feed plate showing the cut away portions for the gripper. Fig. 14 is a detail perspective view of one of the bottle holders with its guides and spring actuated clamps or arms.

The bottle labeling machine embodying my invention comprises in coöperative combination, a rotary bottle carrier 21 furnished with a plurality of radially reciprocating bottle holders 23 thereon, each preferably having a plate 24 for the bottom of the bottle to rest against, a guide 25 to engage and support the side of the bottle and a pair of movable clamps 26 to engage the opposite side of the bottle; a presser-foot or device 43 for pressing the middle portion of the neck-label or band against the upper end of the bottle stopper; a pair of movable pressure pads 44 which press the end portions of the label against the sides of the bottle neck; a vertically movable open bottom magazine 34 for the labels, furnished with narrow ledges or projections for supporting the labels therein; a horizontally reciprocating label feeder or plate 27 adapted to move under the label magazine and receive upon its upper paste covered face the lowermost label, and thus feed the labels one by one from the label magazine to a position under the presser-foot and over the bottle top; a paste receptacle 33; a paste applying device or roller 31 for applying paste to the upper face of the label feed plate and thus to the under face of the label; grippers 36, 77, adapted to grip the front end of the label when it is fed into position over the bottle neck and under the presser-foot, and thus to partially withdraw the label from the label feed plate as said plate withdraws from its forward position over the bottle top; a horizontally reciprocating ejector 65 for pushing the top labeled bottle out of the bottle holder; a horizontal track or way 67 for receiving the top labeled bottles as they are discharged from the bottle holders of the carrier; a supplemental carrier 68 for moving the bottles along the track to the body label applying devices; a reciprocating body label magazine 100; a body label feeder 70, preferably a rotary cylinder, operating in connection with a paste applying segment 71; a body label pasting cylinder 72 to which the body labels are transferred and by which they are pressed or pasted upon the body of the bottle as the bottles are moved under the same by the supplemental carrier; and an elevating mechanism 73 for pressing the bottles against the body label applying roller 72 as the bottles are moved under the same by the carrier 68.

Any suitable operating or connecting mechanism may be employed for communicating to the various moving parts or devices of my machine their required movements in proper time for coöperative action with each other.

The mechanism indicated in the drawing for communicating motion to the movable parts or devices of the machine is that which I prefer to employ, and will be briefly described.

Power is obtained from shaft 1 and is transmitted by means of belt 2 to shaft 3 which drives shafts 6 and 7 through gears 5. Through suitable gearing 101, the shaft 7 drives shaft 8, which in turn drives shaft 9 through beveled gears 102.

The shaft or spindle 14 of the bottle carrier 21 is preferably intermittently operated and locked in position for each quarter turn so as to bring each bottle holder 23 thereon successively into position for registry with the neck label applying devices and the bottle ejector device by the following mechanism.

Shaft 6 carries a crank 10 which is connected by rod 11 to one end of lever 12, at the other end of which is mounted a pawl 13 which engages a ratchet wheel 15 secured to a spindle 14, which is revolved in the direction of arrow through an angle of ninety degrees by the rocking motion of the lever 12 obtained through the rod 11 and crank 10 on shaft 6, said pawl coming to rest in the position shown, ready to engage with the next tooth on the ratchet wheel 15. On the spindle 14 is fastened a circular plate 103 provided with notches 104 on its circumference for the reception of a lever 19 with latch 20 at its end which is pressed into these notches 104 by means of a spring 105, thereby locking same. This lever 19 is actuated by a cam 106 in such manner that when the pawl 13 is about to engage with a tooth of the ratchet wheel 15, the latch 20 is disengaged from the locking wheel 103, but again released immediately after the notch 104 has passed from under the latch 20; so that when the shaft 14 has made a quarter turn, the latch 20 is pressed into the next notch 104, thereby preventing the shaft 14 of the bottle carrier 21 from turning too far.

The swinging arms or clamps 26 with which each of the bottle holders 23 is provided, are furnished with springs 109 which tend to close these clamps inward against the bottle. The bottle is inserted radially into each holder in turn when it is in a horizontal position, thereby pushing the clamps or arms 26 outward against the action of the springs 109. These clamps or arms 26 press against the bottle and push the same against the guides 25, thereby clamping the same securely in place. The bottle is inserted until its bottom rests snugly against the bottom plate 24 of the bottle holder 23.

The top-label feeder or plate 27 is given its required reciprocating motion preferably by a lever 29 which is pivoted at 28. A roller 111 on this lever 29 working in the groove of cam 30 moves the label feed plate 27 by means of lever 29 and connecting rod 112, first to the left and then to the right into the position shown in full lines in Fig. 2, and from this to the position in which the blade 27 is shown by dotted lines 27ª in Fig. 2 and also in Fig. 6.

The paste receptacle 33 is mounted over the path of the label feed plate 27, and is furnished at its base with a roll 32, which, through another roller 31 above the first roll, distributes the paste over the upper face of the label feed plate 27 as the latter passes under the rolls. The receptacle 33 containing the paste is preferably mounted stationarily on the frame of the machine, although it may if desired, be movably mounted so as to be held normally in an elevated position, and lowered only during the forward stroke of the label feed plate 27.

The top-label magazine 34 is also located over the path of the label feed plate 27, and it is preferably moved up and down as required by means of levers 113 through a cam 35, the cam and lever operating to hold the label magazine in such position that the label feed plate 27 can pass under the magazine freely; and when in position shown in Fig. 2, the cam allows the magazine to be lowered through action of its own gravity or otherwise until the bottom label in the magazine comes in contact with the upper face of the label feed plate 27, the upper face of which has just been coated with paste by the paste applying device or roller 31. The lower label in the magazine then adheres to the plate 27 by reason of the paste, and as the magazine again rises, the plate 27 pulls the lowermost label out of the magazine 34 and carries it into position over the bottle neck where the gripping finger 36 grips the end of the label against the opposing gripper or plate 77.

The labels are supported in the magazine 34 by means of narrow ledges or projections 115 at the lower edge of two sides of the magazine, which enter corresponding grooves 116 in the label feed plate 27 when the magazine is depressed. As the magazine rises, the lower label adheres to the plate and is bulged downward somewhat, and then its edges readily slip over the narrow ledges or projections 115 at the sides of the label magazine. The label feed plate 27 is cut out or furnished with notches or slots 117 at its front end to accommodate or clear the gripping fingers 36.

The gripping fingers 36 are preferably operated or opened and closed against the opposing gripper or plate 77 by means of a shaft 76 to which the grippers 36 are secured, and which is mounted upon brackets 118, fastened to plate 77. The gripper shaft 76 has a rocker arm 78 which is connected through a rod 38 with a lever 37, actuated by a cam 41. The plate 77 is fastened to an adjustable guide rod 79 which also carries the stop 82. This guide rod 79 is under the influence of springs 81 and has a stop 80 which limits the movement of the rod in one direction. The turning of cam 41 produces first a slight turning of the gripper shaft 76 carrying the upper grippers 36, thereby opening the grippers 36, 77, and then the rocker arm 78 comes in contact with stop 82 which limits the movement of the gripper shaft 76. The further turning of cam 41 moves the gripper plate 77 with gripper fingers 36, stop 82 and rod 79 back a predetermined distance against the action of spring 81, after which a return movement of lever 37 and rod 38 takes place. The action of the springs tends to force the rod 79 with plate 77 and stop 82 back again, thereby following the return movement of rod 38, which prevents the gripper shaft from turning until prevented from going farther by stop 80, after which a slight additional movement of rod 38 due to cam 41 and lever 37 actuates the gripper fingers 36, thereby closing the gripping mechanism. However, before this closing takes place, the label feed plate 27 brings another label under the gripping fingers 36, which then close and hold the label in such a position that it will be directly over the top of the bottle standing upright in the holder 23 on the revolving bottle carrier 21 while the label feed plate 27 recedes. As the rod 79 is slidable in its support, the grippers are opened in proper position to receive the label and closed thereon and then again opened in proper position to release the label by the connecting operating mechanism above mentioned. The bottle holder 23 with the bottle 22 therein is now moved upward through the action of a spring 119 at one end of the bell crank lever 40, the other end 42 of which engages with an adjustable lug 39 on the bottle holder 23, but which has been held down in a somewhat lower position by the cam 41. At the same time, the label paster or presser-foot 43 and pressure pads 44 are moved in a downward direction. The plunger 45 with spring 48 is free to slide in the hollow rod 47 which carries the pressure pads 44. The rod 45 has a pin 45ᵃ fitting in a slot 47ᵃ in the bar 47 to keep the one from turning in respect to the other. Rod 47 is cushioned by a spring 50 in the hollow rod 49 and is free to slide in same. This rod has arms 51 which carry adjustable push pins 52. These pins are located over arms 53 which are extensions of the swinging arms 54 to which the pressure pads 44 are fastened. The rod 49 has at its upper end a projecting lug 55 which connects with one end of a link 56, the other end of which connects with arm 58 through stud 57. To this arm is connected another link 60 by means of stud 59. Motion is obtained from cam 61 by means of a roller, mounted on arm 62, which at the proper instant is pulled down, thereby causing a downward movement of the arms and links 55, 56, 58 and 60 and the rods 49, 47 and 45.

In pushing down the rods 49, 47 and 45, the plunger rod 45 with its presser foot 43 first comes in contact with the label 120 on top of the bottle, thereby pressing and pasting the middle portion of the label on the upper face of the stopper or cover of the bottle. The rods 47 and 49 continue in their downward movement, carrying with them the swinging arms 54 with their pressure pads 44, while at the same time the gripping fingers 36 release the end of the label and move backward out of the way, while the plunger rod 45 recedes against the spring 48. By this continued downward movement, the pressure pads 44 bend the projecting ends of the label or band 120 down against the sides of the neck or head portion of the bottle. The rod 47 is furnished with a lug 121 fitting in a slot 49ᵃ in the hollow rod 49 which serves to hold the rod 47 within the hollow rod 49 and prevent it from being pushed out by the spring 50. As rod 49 comes further downward, the pins 52 come in contact with arms 53 of levers 54 which swing inward, thus pressing the pads 44 against the label and thereby pasting same securely to the neck of the bottle. The pressure or pasting pads 44 and presser foot 43 are preferably made of or faced with elastic material. The rod 49, together with rods 47 and 45, is now raised again by action of cam 61, after which the bottle carrier 21 is revolved through ninety degrees and another label brought forward over the next bottle which is now held in an upright position, the same having been inserted into the holder in a horizontal position with the head or neck of the bottle pointing forward. The quarter turn of the bottle carrier brings the labeled bottle into a horizontal position with its head or neck pointing toward the back or rear end of the machine. An arm or ejector device 65 at the side of the bottle is actuated by cam 66 at the proper instant, and pushes the bottle horizontally to one side out of its holder onto a track 67, the clamping arms 26 of the bottle holder at the same time tending to release the bottle and to permit it to be discharged laterally from the holder. The track 67 is furnished with a chain carrier 68 which moves the top labeled bottles along as they reach the position where the body labels are pasted on by the body labeling mechanism.

The magazine 100 containing the body labels is mounted on a horizontally reciprocating slide 69 and is moved back and forth over a body label feed cylinder 70 having a segment 71 to which paste is applied, and by means of which the lowermost label is extracted from the magazine. The labels are then transferred from this cylinder 70 with the paste covered side outward to the pressure or pasting cylinder 72 under which the bottles are made to pass and by which the body labels are pasted upon the bottles. An elevating mechanism 73, carrying the bottle and operated by levers 83 through action of a spring 122 brings the bottle in contact with the label on cylinder 72. The operation of these levers 83 is controlled by a cam 123 on shaft 8, which, through lever 124 and rod 125 releases the pin 75 at the proper moment, thereby permitting the spring to act. Paste is applied to the segment 71 of cylinder 70 from the paste receptacle 126 through the rollers 127, 128. The slide 69 of the body label magazine is reciprocated through chains 129, to which a rod 130 is connected by bolts 132, running on chain wheels 133 and 134, receiving the motion by gears 135 and 135 from shaft 8.

The lugs 39 on the radially movable bottle holders 23 which are engaged by the lever 40 to move the bottle upward at the required time, are adjustably secured to the bottle holders by screws or bolts 136, the bottle holders 23 being furnished with slideways 137 to adapt these stop lugs 39 to be adjusted to different positions to accommodate bottles of different lengths or sizes.

I claim:—

1. In a machine for pasting labels or bands over the stoppers of bottles, the combination with an intermittently revolving bottle carrier provided with a plurality of radially movable bottle holders, of a presser-foot for pasting the middle portion of the label to the bottle stopper, and two pressure pads for pasting the end portions of the label against the sides of the bottle neck, substantially as specified.

2. In a machine for pasting labels or bands over the stoppers of bottles, the combination with an intermittently revolving bottle carrier provided with a plurality of radially movable bottle holders, of a presser-foot for pasting the middle portion of the label to the bottle stopper, two pressure pads for pasting the end portions of the label against the sides of the bottle neck, and means for feeding and supporting the label over the top of the bottle neck and under the presser foot, substantially as specified.

3. In a machine for pasting labels or bands over the stoppers of bottles, the combination with an intermittently revolving bottle carrier provided with a plurality of radially movable bottle holders, of a presser-foot for pasting the middle portion of the label to the bottle stopper, two pressure pads for pasting the end portions of the label against the sides of the bottle neck, each of said bottle holders on the carrier having outwardly opening guides and spring actuated swinging arms clamping the bottle against said guides, substantially as specified.

4. In a machine for pasting labels or bands over the stoppers of bottles, the combination with an intermittently revolving bottle carrier provided with a plurality of radially movable bottle holders, of a presser-foot for pasting the middle portion of the label to the bottle stopper, two pressure pads for pasting the end portions of the label against the sides of the bottle neck, each of said bottle holders on the carrier having outwardly opening guides and spring actuated swinging arms clamping the bottle against said guides, said swinging arms of the bottle holder permitting the neck labeled bottle to be discharged laterally, substantially as specified.

5. In a machine for pasting labels or bands over the stoppers of bottles, the combination with an intermittently revolving bottle carrier provided with a plurality of radially movable bottle holders, of a presser-foot for pasting the middle portion of the label to the bottle stopper, two pressure pads for pasting the end portions of the label against the sides of the bottle neck, a lever and cam for moving the bottle holder upward toward the presser-foot, each of said bottle holders having a lug for engagement with said lever, substantially as specified.

6. In a machine for pasting labels or bands over the stoppers of bottles, the combination with an intermittently revolving bottle carrier provided with a plurality of radially movable bottle holders, of a presser foot for pasting the middle portion of the label to the bottle stopper, two pressure pads for pasting the end portions of the label against the sides of the bottle neck, a lever and cam for moving the bottle holder upward toward the presser-foot, each of said bottle holders having an adjustable lug for engagement with said lever, substantially as specified.

7. The combination with a bottle holder, of a presser-foot for pasting the middle portion of a label against the stopper of a bottle, a pair of pressure pads for pasting the end portions of the label against the sides of the bottle neck, a label magazine, a paste receptacle, a label feed plate reciprocating under said paste receptacle and said label magazine, and grippers engaging one end of the label to hold it over the bottle neck while said feed plate recedes, substantially as specified.

8. The combination with a bottle holder, of a presser-foot for pasting the middle portion of a label against the stopper of a bottle, a pair of pressure pads for pasting the end portions of the label against the sides of the bottle neck, a label magazine, a paste receptacle, a label feed plate reciprocating under said paste receptacle and said label magazine, and grippers engaging one end of the label to hold it over the bottle top while said feed plate recedes, said label feed plate being cut out to accommodate the grippers, substantially as specified.

9. The combination with a bottle holder, of a presser-foot for pasting the middle portion of a label against the stopper of a bottle, a pair of pressure pads for pasting the end portions of the label against the sides of the bottle neck, a label magazine, a paste receptacle, a label feed plate reciprocating under said paste receptacle and said label magazine, and grippers engaging one end of the label to hold it over the bottle top while said feed plate recedes, and means for moving the label magazine up and down to cause the lowermost label therein to engage and adhere to the paste covered face of said feed plate, substantially as specified.

10. The combination with a bottle holder, of a presser-foot for pasting the middle portion of a label against the stopper of a bottle, a pair of pressure pads for pasting the end portions of the label against the sides of the bottle neck, a label magazine, a paste receptacle, a label feed plate reciprocating under said paste receptacle and said label magazine, and grippers engaging one end of the label to hold it over the bottle top while said feed plate recedes, and means for moving the label magazine up and down to cause the lowermost label therein to engage and adhere to the paste covered face of said feed plate, said label magazine being open at its lower end and having narrow ledges to support the labels therein, substantially as specified.

11. In a machine for labeling the tops of bottles, the combination with a bottle holder, of a presser-foot for pasting the middle portion of the label against the stopper, a pair of pressure pads for pasting the end portions of the label against the sides of the bottle neck, swinging arms carrying said pressure pads, a plunger rod 45 carrying said presser-foot, a hollow rod 47 and a further hollow rod 49 provided with adjustable stops and springs, said parts coöperating to cause the presser-foot to first strike the top of the bottle and paste the middle portion of the label, and then to cause the swinging arms to move down over the head of the bottle, and finally as rod 47 reaches its lower limit of travel, to cause rod 49 carrying stop pins to engage the swinging arms and force the pressure pads against the neck of the bottle, substantially as specified.

12. In a bottle labeling machine, the combination with an intermittently rotating bottle carrier, of a plurality of bottle holders on said carrier, furnished each with opening and closing clamps, means for applying a label to the top of the bottle, a track for the bottles adjacent to said carrier, and an ejector for pushing each bottle in turn horizontally out of the holder on the carrier onto said track, substantially as specified.

13. In a bottle labeling machine, the combination with an intermittently rotating bottle carrier, of a plurality of bottle holders on said carrier, furnished each with opening and closing clamps, means for applying a label to the top of the bottle, a track for the bottles adjacent to said carrier, and an ejector for pushing each bottle in turn horizontally out of the holder on the carrier onto said track, a chain carrier for moving the bottles along said track, and means for applying a further label to the body of the bottle, substantially as specified.

14. In a bottle labeling machine, the combination with an intermittently rotating bottle carrier having a plurality of bottle holders furnished with opening and closing clamps, top label applying mechanism, body label applying mechanism, means for conveying the bottles from said intermittently rotating carrier to the body label applying mechanism, and means for ejecting the bottles from the holders of said intermittently rotating bottle carrier, substantially as specified.

15. In a bottle labeling machine, the combination with an intermittently rotating bottle carrier having a plurality of bottle holders furnished with opening and closing clamps adapted to permit the bottles to be ejected laterally from the holders when the holders are in a horizontal position, mechanism for applying labels to the tops of the bottles, and an ejector for pushing the bottles horizontally out of said bottle holders, substantially as specified.

16. In a bottle labeling machine, the combination with an intermittently rotating bottle carrier furnished with a plurality of radially movable bottle holders, each provided with a lug adapted to be engaged by an operating lever, means for feeding and supporting a label over the bottle, a presser-foot for pasting the label against the bottle and an operating lever for moving the bottle holder toward the label and presser-foot, substantially as specified.

17. In a bottle labeling machine, the combination with a bottle holder, of a presser-foot for pasting a label against the top of a bottle in said holder, a label magazine, means for feeding the label into position across the top of the bottle and under said presser foot, and means for moving the bottle holder upward toward the label, substantially as specified.

18. In a bottle labeling machine, the combination with a bottle holder, of a presser-foot for pasting a label against the top of a bottle in said holder, a label magazine, means for feeding the label into position across the top of the bottle and under said presser foot, and means for gripping the front end of the label to hold it in position over the bottle, substantially as specified.

19. In a bottle labeling machine, the combination with a bottle holder, of a presser-foot, a label magazine, means for feeding the label into position across the top of the bottle, means for gripping the front end of the label to hold it in position over the bottle, and a pair of pressure pads movable downward and inward over the bottle top to paste the end portions of the label against the sides of the bottle neck, substantially as specified.

20. In a bottle labeling machine, the combination with a bottle holder, of a presser-foot, a label magazine, means for feeding the label into position across the top of the bottle, means for moving the bottle holder upward toward the label, and a pair of pressure pads movable downward and inward over the bottle top to paste the end portions of the label against the sides of the bottle neck, substantially as specified.

21. In a bottle labeling machine, the combination with a bottle holder, of a presser-foot, a label magazine, means for feeding the label into position across the top of the bottle, paste applying means, and a pair of pressure pads movable downward and inward over the bottle top to paste the end portions of the label against the sides of the bottle neck, substantially as specified.

22. In a bottle labeling machine, the combination with a bottle holder, of a presser-foot for pasting a label against the top of a bottle in said holder, a label magazine, means for feeding the label into position across the top of the bottle and under said presser foot, means for moving the bottle holder upward toward the label, and means for gripping the front end of the label to hold it in position over the holder, substantially as specified.

23. In a bottle labeling machine, the combination with a bottle holder, of a presser-foot for pasting a label against the top of a bottle in said holder, a label magazine, means for feeding the label into position across the top of the bottle and under said presser foot, means for moving the bottle holder upward toward the label and paste applying means, substantially as specified.

24. In a bottle labeling machine, the combination with a bottle holder, of a presser-foot for pasting a label against the top of a bottle in said holder, a label magazine, means for feeding the label into position across the top of the bottle and under said presser foot, means for gripping the front end of the label to hold it in position over the bottle, and paste applying means, substantially as specified.

25. In a bottle labeling machine, the combination with a bottle holder, of a presser-foot, a label magazine, means for feeding the label into position across the top of the bottle, an ejector for discharging the bottle from said holder, mechanism for applying a further label to the body of the bottle, and a track and conveyer for moving the bottles from said top labeling mechanism to said body labeling mechanism, substantially as specified.

26. The combination with a vertically movable bottle holder, of a presser-foot for pasting the middle portion of a label to the bottle stopper, and a pair of vertically and inwardly movable pressure pads for pasting the end portion of the label to the neck of the bottle, substantially as specified.

27. The combination with a vertically movable bottle holder, of a presser-foot for pasting the middle portion of a label to the bottle stopper, a pair of vertically and inwardly movable pressure pads for pasting the end portion of the label to the neck of the bottle, a label magazine having an open lower end, a horizontally reciprocating label feed plate, means for applying paste to the upper face of said plate, and grippers to engage the front end of the label and cause it to be stripped from said feed plate as said plate recedes, substantially as specified.

28. The combination with a vertically movable bottle holder, of a presser-foot for pasting the middle portion of a label to the bottle stopper, a pair of vertically and inwardly movable pressure pads for pasting the end portion of the label to the neck of the bottle, a label magazine having an open lower end, a horizontally reciprocating label feed plate, means for applying paste to the upper face of said plate, grippers to engage the front end of the label and cause it to be stripped from said feed plate as said plate recedes and means for moving said label magazine up and down, substantially as specified.

29. The combination with a vertically movable bottle holder, of a presser-foot for pasting the middle portion of a label to the bottle stopper, a pair of vertically and inwardly movable pressure pads for pasting the end portion of the label to the neck of the bottle, a label magazine having an open lower end, a horizontally reciprocating label feed plate, means for applying paste to the upper face of said plate, grippers to engage the front end of the label and cause it to be stripped from said feed plate as said plate recedes, means for moving said label magazine up and down, and a carrier upon which the bottle holder is mounted, substantially as specified.

30. In a labeling machine, the combination with a carrier furnished with four holders having opening and closing clamps, means for turning said carrier to bring each holder therein successively into an upright position and successively into a horizontal position, an ejector coacting with each holder when in a horizontal position, and a labeling mechanism coacting with each holder when in an upright position, substantially as specified.

31. In a labeling machine, the combination with a carrier furnished with four holders having opening and closing clamps, means for turning said carrier to bring each holder therein successively into an upright position and successively into a horizontal position, an ejector coacting with each holder when in a horizontal position, labeling mechanism coacting with each holder when in an upright position, and a track and second carrier coacting with said ejector, substantially as specified.

32. In a labeling machine, the combination with a carrier furnished with four holders having opening and closing clamps, means for turning said carrier to bring each holder therein successively into an upright position and successively into a horizontal position, and an ejector coacting with each holder when in a horizontal position, said holders being radially movable on said carrier and a presser foot coöperating with said radially movable holders to paste labels against the tops of bottles in said holders, substantially as specified.

33. In a labeling machine, the combination with a carrier furnished with four holders having opening and closing clamps, means for turning said carrier to bring each holder therein successively into an upright position and successively into a horizontal position, an ejector coacting with each holder when in a horizontal position, said holders being radially movable on said carrier, and means for vertically moving each holder when in an upright position and a presser foot coöperating with said radially movable holders to paste labels against the tops of bottles in said holders, substantially as specified.

34. In a labeling machine, the combination with a carrier furnished with four holders having opening and closing clamps, means for turning said carrier to bring each holder therein successively into an upright position and successively into a horizontal position, an ejector coacting with each holder when in a horizontal position, said holders being radially movable on said carrier, means for vertically moving each holder when in an upright position, and a labeling mechanism coacting with each holder when in an upright position, substantially as specified.

35. In a labeling machine, the combination with a carrier furnished with four holders having opening and closing clamps, means for turning said carrier to bring each holder therein successively into an upright position and successively into a horizontal position, an ejector coacting with each holder when in a horizontal position, labeling mechanism coacting with each holder when in an upright position, a track and second carrier coacting with said ejector, and a second label applying mechanism coacting with said track and second carrier, substantially as specified.

36. In a labeling machine, the combination with a holder for the article to be labeled, of a label magazine having an open bottom, a horizontally movable label feed plate for feeding the labels one by one from said magazine and moving the same into position over the holder, and grippers engaging the front end of the label to hold it over said holder, substantially as specified.

37. In a labeling machine, the combination with a holder for the article to be labeled, of a label magazine having an open bottom, a horizontally movable label feed plate for feeding the labels one by one from said magazine and moving the same into position over the holder, grippers engaging the front end of the label to hold it over said holder, and pasting devices coacting with said holder, grippers and feed plate, substantially as specified.

38. In a labeling machine, the combination with a holder for the article to be labeled, of a label magazine having an open bottom, a horizontally movable label feed plate for feeding the labels one by one from said magazine and moving the same into position over the bottle holder, grippers engaging the front end of the label to hold it over said holder, pasting devices coacting with said holder, grippers and feed plate, and means for ejecting the labeled article from said holder, substantially as specified.

39. In a labeling machine, the combination with a holder for the article to be labeled, of a label magazine having an open bottom, a horizontally movable label feed plate for feeding the labels one by one from said magazine and moving the same into position over the bottle holder, grippers engaging the front end of the label to hold it over said holder, pasting devices coacting with said holder grippers and feed plate, and means for opening the grippers to release the end of the label as the pasting devices descend, substantially as specified.

FERD. EMIL JAGENBERG.

Witnesses:
OTTO MATTHES,
ARTHUR STEINMETZ.